June 25, 1968   A. J. MEYERHOFF ET AL   3,390,330
THIN FILM CRYOGENIC SUPERCURRENT MEASURING DEVICE
Filed Sept. 18, 1964

INVENTORS.
ALBERT J. MEYERHOFF
CHIEN C. HUANG
CHARLES B. HEBELER

United States Patent Office 3,390,330
Patented June 25, 1968

3,390,330
THIN FILM CRYOGENIC SUPERCURRENT MEASURING DEVICE
Albert J. Meyerhoff, Wynnewood, Pa., Chien Chanz Huang, Stamford, Conn., and Charles B. Hebeler, Farmington, Mich., assignors to Burroughs Corporation, Detroit, Mich., a corporation of Michigan
Filed Sept. 18, 1964, Ser. No. 397,453
4 Claims. (Cl. 324—117)

ABSTRACT OF THE DISCLOSURE

The present application discloses a thin film device for indicating the presence, the magnitude and the direction of a supercurrent flowing in a cryogenic circuit. Basically it is a three element thin film in-line cryotron whereon one element carries the supercurrent to be measured, another element carries a reference current and a third element, having a non-uniform or wedge-like shape, carries a bias current to control the resistive length of the element carrying the reference current. Also disclosed is a circuit utilizing the novel three-element cryotron in an operative configuration which uses the wedge-like member to provide a feedback bias which improves stabilization.

---

This invention relates to a cryogenic means for reading and measuring the current in a cryogenic circuit. More particularly, this invention relates to a device for indicating the presence, as well as the magnitude and direction of the supercurrent in a cryogenic circuit.

Superconductivity and cryogenics are relatively new terms in the electronic art. Generally, they relate to the disappearance of the resistance characteristics, which an electrical conducting material normally possesses, when the material is subjected to an extremely low temperature environment.

The absence of resistance enables the material to conduct in a completely lossless manner and the material is said to be a superconductor. The current flowing at this time is often referred to as supercurrent. It has been found that this condition could be terminated by the application of a magnetic field of a particular magnitude. That is, the material would return to its normal (resistive) state when an applied magnetic field reached a given magnitude. This magnetic field level is called the critical field. Conversely, the removal of this magnetic field or its reduction below the critical level causes the material to return to its superconducting state.

One of the most significant characteristics of a superconducting circuit is its ability to maintain an initiated current flow after the initiating means has been removed. Thus, so long as there is no change in externally-applied magnetic fields, any supercurrent, once initiated, will continue to flow as long as the superconducting state exists. These continuing supercurrents are referred to in the cryogenic art as persistent currents. This phenomenon is a very valuable one suggesting means for information storage. It is also useful with cryogenic transformers where the secondary current, once induced, will continue to flow without additional input primary energy.

However, when the need arises to measure a persistent current, it is immediately apparent that ordinary measuring techniques cannot be used. The current, by definition, does not flow through any resistance where a potential difference could be measured. Further, because the current is direct current, no reactive potentials are produced, and finally, it is not permissible to disturb the electromagnetic field in any manner that would impede the persistent current flow.

As pointed out previously, a persistent current circulates with a positive potential at every point around its path. Any device used for measuring the current must preserve the nonresistive nature of the circuit and avoid altering the current in any way. Since all current flow has an associated vector magnetic field whose magnitude and direction are related to the magnitude and direction of the flowing current, a device that is sensitive to magnetic fields could be used to detect and measure the current.

One such known device is a crossed film cryotron. This is a cryogenic device wherein a first deposited film conductor, carrying the current flow, has a second film deposited across (but insulated from) it. The presence of a persistent current flowing in the first film is used to cause the second film to become resistive. A small current caused to flow through this resistive film will create a measurable voltage drop across the resistive portion of the second film, thereby enabling a readout indication of the persistent current. This technique, however, reveals only the presence of persistent current. It gives little information on the magnitude and no information on the direction of the circulating current.

If the second film, in the above example, were deposited in the same direction as the first, rather than at right angles to it, the device would be an in-line cryotron. The in-line cryotron can be substituted in the above example, with somewhat the same results. However, the in-line device offers the advantage of a much higher readout voltage due to the long, narrow area of the second film which becomes resistive. Also, the long resistive area of the second film in this configuration enables further development of a measuring technique.

Consideration of the fact that the output voltage is largely dependent upon the length of the readout film which becomes resistive makes it apparent if the length of the resistive portion of the second or readout film can be made proportional to the persistent current, then large variations in output voltage can be obtained for variations in the magnitude of the persistent current. In other words, if the coupling between the first and second films (persistent current and readout conductors, respectively) can be varied as a function of the distance along the readout film, then various points along the readout film would require increasingly greater amounts of persistent current before becoming resistive. This effect has been achieved by the present invention wherein a wedge-shaped bias or control film is used in conjunction with an in-line cryotron to provide a means of measuring current magnitude.

The wedge-shaped element used herein has been more fully described in a co-pending application assigned to the present assignee. It is entitled "Electrical Circuit Element" and its inventors are Harvey Rosenberg and Edwin S. Lee III. The filing date of that application was May 28, 1962 and the Serial Number is 198,329, now Patent No. 3,283,282. The contents of that specification are incorporated herein by this reference.

The present invention also provides a solution to the problem of measuring current direction. This has been accomplished by the inclusion of a third control element to the readout portion of a cryotron.

For example, in the case of an in-line cryotron, a third film is deposited adjacently parallel to the first and second. The second film is designed such that the presence of a persistent current to be measured in the one film and the presence of a bias current in the other together cause the second film to become resistive. Obviously, it is now possible to determine the presence and the direction of a persistent current.

Therefore, it is the primary object of this invention to provide a means for determining the presence, the magnitude and the direction of a current flowing in an electrical conductor.

It is also an object of this invention to provide a means which accomplishes this determination in a cryogenic circuit in a manner which does not disturb the flow of a persistent current through a superconductor of said circuit.

It is a further object of the present invention to provide a cryogenic device having a nonuniform cross-sectional element which is useful for measuring currents having magnitudes down to zero level.

It is a still further object of the present invention to provide an in-line cryogenic device having a wedge-shaped element which is useful for measuring bidirectional supercurrents having magnitudes down to a zero level.

It is a still further object of the present invention to provide such a cryogenic circuit persistent current measuring device having a feedback portion whereby deviations from predicted device performance caused by edge irregularities and nonuniform thickness of the deposited films are minimized.

Various other objects and advantages will appear in the following description of one embodiment of the invention and the novel features will be particularly pointed out hereinafter in connection with the appended claims. The invention itself, however, both as to organization and method of operation, may be best understood by reference to the following description taken in connection with the drawings wherein:

Figure 1:
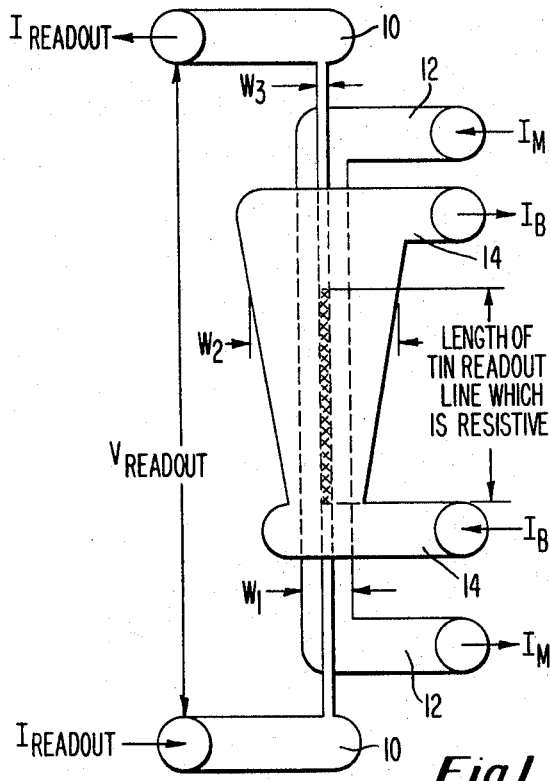
FIG. 1 is an illustration of one embodiment of the present invention showing the geometry and position of thin-film elements.

Generally, in reference to the drawings, it is noted that similar reference numerals refer to like elements in all figures. It is also to be understood that in the interest of simplicity only the films are illustrated. The necessary insulating coatings between all of the films are well known in the thin-film art and similarly, all of the films shown were deposited upon suitable substrate material having a deposited film or otherwise furnished ground shield applied thereon. Such ground shields are also well known in the thin-film art.

Figure 2:
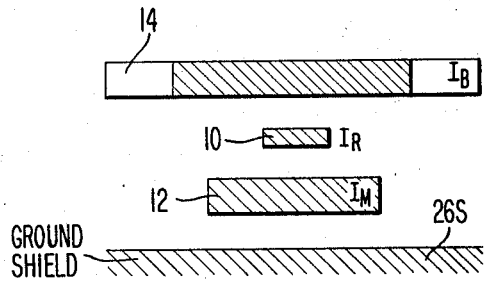
FIG. 2 illustrates an end view of the embodiment of FIG. 1.

Referring in particular to FIGURES 1 and 2, there is shown a plan view and an end section of the three-element, cryogenic device suggested by the present invention. As previously noted, the deposited ground shield 26S shown in FIGURE 2 is first applied to a suitable substrate material (not shown) and the shield 26S is covered with a suitable film of insulation (not shown). Next, a measuring film 12 is deposited upon the insulated ground shield 26S. A measuring current $I_M$ is carried by this film 12. A read (gate) film 10 and a bias (control) film 14 are then respectively deposited thereon with their corresponding insulating films sandwiched therebetween. The films deposited as shown in FIGURE 1 illustrate an in-line cryogenic configuration, since the gate and control films 10 and 14 are placed adjacently parallel to each other in a lengthwise manner. As previously discussed, an in-line configuration is the preferred embodiment of the present device.

Ordinarily, the in-line cryotron is a threshold device whose output is either all or nothing. Upon switching by the control film, the gate film becomes resistive along its entire length due to the uniform magnetic field from the bias film impinging upon it.

Where the control film has a nonuniform cross-sectional portion, the gate film is subjected to a nonuniform magnetic field. Where, for example, the control film is wedge-shaped, as is film 14, the intensity of the field is a function of the distance along the length of the wedge. At the narrow end of the wedge 14 the intensity of the field is greatest, since the current density is highest through the smallest cross-sectional film area. Conversely, at the widest portion of the wedge control film 14, the field intensity is lowest since the same current is passing through a larger cross-sectional film area. Thus, it is possible for the field applied upon the read film 10 by the control film 14 to exceed the critical switching value of the read film 10 at the narrow end of film 14 and not exceed it at the wide end.

The read film 10 is, of course, resistive in that portion of its length which is impinged by a field of equal or greater intensity than the "critical" field.

As current $I_B$, through the control film 14, is increased, more of the read film 10 will become resistive and the read voltage output $V_{(READOUT)}$ for a given readout current $I_{(READOUT)}$ will increase.

Up to this point the device has been assumed to include only read film 10 and wedge control film 14. However, such a device does provide an output voltage $V_{(READOUT)}$ which is proportional to the magnitude of the control current $I_B$, so long as the curent $I_B$ is above a threshold value. This threshold current value is, of course, the current necessary to create the minimum critical field necessary to resistively switch at least some portion of the read film.

To restate an original objective, however, a device is desired which will measure the magnitude and direction of the current flowing in a superconductor without presenting any impedance to the circuit. A device that does not have a range from zero current is not satisfactory.

However, if another film element 12 is added to the device as shown in FIGURES 1 and 2, the magnetic field, due to its current, will also impinge on the read film 10. If the new element, referred to herein as the measure film 12, is interposed between the read film 10 and the ground shield plane 26S as shown in the sectional end view of FIGURE 2, the field impinging on the read film 10 will be the vector sum of that due to the wedge current $I_B$ in the wedge film 14 and that due to current $I_M$ in the measure film 12. This device has been named a "wedgetron" by its inventors, and any future reference made herein to this name will denote the device illustrated in FIGURES 1 and 2.

The wedgetron operates in the following manner. The measure film 12 is made an integral part of the superconducting circuit in which the current is to be measured, such as the secondary of a cryogenic transformer. The wedge film 12 current $I_B$ serves as a bias and is set at that value which causes the read film 10 to become resistive for one half of its length. When the current to be measured $I_M$ flows through the measure film 12, its magnetic field will aid or oppose the wedge bias field in the area of the read film 10 and the resistive length of the read film 10 will either increase or decrease proportionately. This device thereby provides a means of determining the existence, as well as measuring the magnitude and the direction, of superconducting currents without impeding the flow of said supercurrent.

Figure 3:
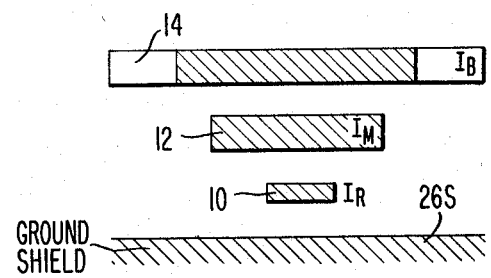
FIG. 3 illustrates an end view of an alternate embodiment.

FIGURE 3 includes the same film elements as does FIGURE 2; however, in FIGURE 3, the positions of the measure film 12 and the read film 10 have been interchanged, the position of the measure film 12 now between the read film 10 and the wedge film 14. Similar results were obtained with this configuration. Consideration was also given to interchanging the functions of the various films in the wedgetron. That is, allow the wedge film 14 to carry the current to be measured, with the bias current supplied by the measure film 12. It was noted that a higher value of current was needed to initiate read gate 10 resistance. It should also be mentioned that the read gate 10 resistance starts from its opposite end in this instance and will progress in an opposite direction from the wedgetron configuration shown in FIGURES 1 and 2. However, this is not really significant to the operation of the device.

To summarize, a wedgetron, as a current-measuring device, provides an output voltage that is directly proportional to the current being measured. It may also be designed to provide an output voltage that is inversely proportional to the current being measured. The output voltage $V_{(READOUT)}$ is proportional to the length of the read film 10 which is resistive. This resistive length is a function of the magnetic field impinging upon it. This magnetic field, in turn, is a function of the vector sum of the current densities along the current-carrying conductors. It is evident, therefore, that the characteristics of the device are dependent upon purity of materials and accuracy of fabrication. For example, edge irregularities and nonuniform thickness of the films will cause deviations from predicted device performance.

Figure 4:
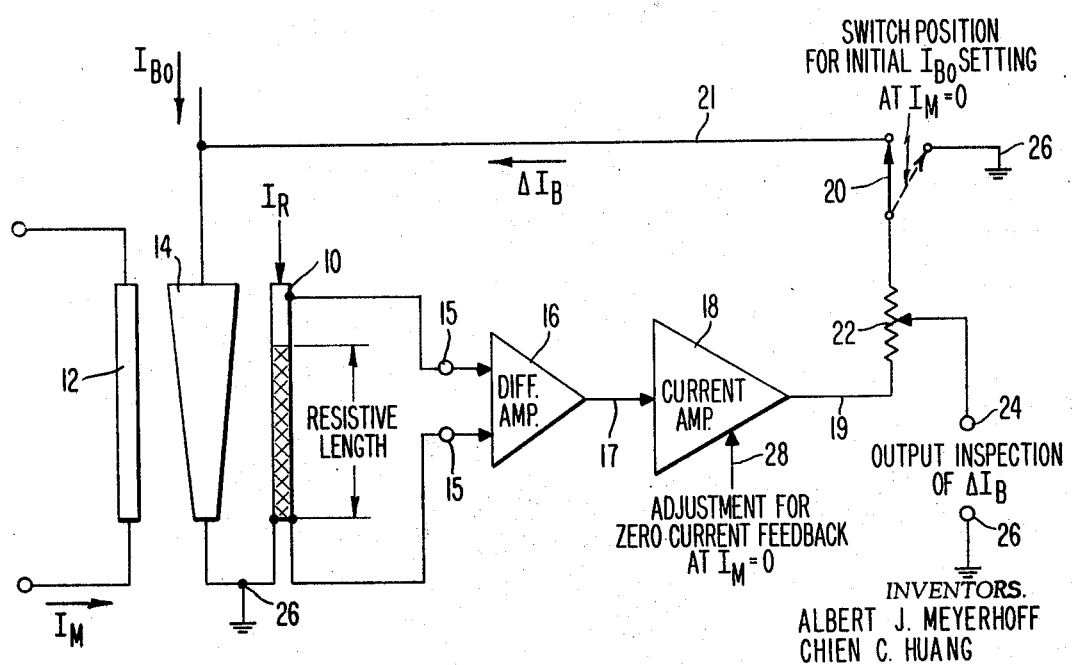
FIG. 4 illustrates an embodiment of the suggested device including a feedback network to minimize the effect of variations in manufacturing techniques.

In order to minimize the effects of such defects, a feedback circuit including a wedgetron was designed. Such a circuit is logically shown in FIGURE 4. The feedback portion of the circuit is operative such as would tend to maintain a constant resistive length of the readout gate film 10.

The circuit operates as follows. An increasing bias current $I_{Bo}$ is applied through the wedge film 14 to ground terminal 26 until a sufficiently high magnetic field is emanated from the wedge film and applied to the read gate 10 to cause the read gate to become resistive along one half of its length. With the feedback connect switch 20 in the disconnected (grounded) position, the feedback adjustment 28 on current amplifier 18 is adjusted until no current is flowing through conductor 19. The feedback connect switch 20 is then closed (connected to conductor 21). The current to be measured $I_M$ is then applied to measure film 12 such as to flow in the direction of the arrow. Since the current $I_M$ is flowing in the opposite direction to the bias current $I_{Bo}$, it will offset the magnetic field created by the bias current $I_{Bo}$ and the length of the resistive portion of read film 10 will be reduced. This reduction in the resistive length of gate 10 will produce a corresponding change in read voltage. This voltage change will be applied to input terminals 15 of a differential amplifier 16. It will be amplified therein and applied through conductor 17 to current amplifier 18. The resulting amplified current is fed back to bias film 14 through conductor 19, resistor 22, switch 20 and conductor 21 as a change in bias current $\Delta I_B$. The increased bias current $(I_{Bo}+\Delta I_B)$ causes a corresponding increase in the bias magnetic field, which, in turn, increases the resistive length of read gate 10 to offset its initial reduction by the change in measure current $I_M$. Since the feedback current $\Delta I_B$ will be proportional to the measure current $I_M$, a calibrated voltage output can be monitored between output terminals 24 and 26 of the circuit. With the resistive length of the gate film 10 remaining essentially constant as a result of the feedback current, many film imperfections are rendered inconsequential. The feedback circuit also offers increased range of the current-measuring capabilities of a wedgetron.

While there have been shown and described certain fundamental novel features of a preferred embodiment of the invention, it is understood, of course, that one skilled in the art could create numerous variations of the preferred embodiment without departing from the spirit of the invention. It is the intention, therefore, to be limited only by the scope of the following claims.

What is claimed is:

1. A cryogenic in-line film supercurrent measuring device capable of indicating the presence, the magnitude and the direction of said supercurrent flow in a cryogenic circuit comprising at least a first, a second and a third superconducting film physically positioned adjacently parallel to each other, said first superconducting film having a wedge-shaped portion to produce, upon activation, a first magnetic field having progressively changing magnetic intensities at successive segments of said wedge-shaped portion, to impinge upon said second superconducting film, the magnetic intensities of said first field being above a certain critical magnitude along a selected reference length of said wedge-shaped element and below said critical magnitude along its remaining length, said reference length portion of said first field causing a corresponding reference length of said second superconducting film serially connected to said circuit supercurrent flow, to produce, upon activation by said supercurrent to be measured, a second magnetic field to impinge upon said second superconducting film, the direction of said second magnetic field aiding or opposing the direction of said first magnetic field upon said second superconducting film whereby the resistive length of said second superconducting film is varied from said reference length in an amount corresponding to the vector sum of said first and second magnetic fields to thereby provide an indication of the presence, the magnitude and the direction of the current to be measured.

2. The cryogenic in-line film supercurrent measuring device as set forth in claim 1 wherein said first, second and third films are deposited upon a ground plane shield film which has been deposited upon a substrate.

3. The cryogenic in-line film supercurrent measuring device as set forth in claim 2 wherein said first, second and third films are insulated from said ground plane and from each other by insulating films.

4. A constant readout thin-film cryogenic measuring device comprising a wedge-shaped superconducting thin-film element connected to a fixed source of bias current, a measuring superconducting thin-film element adjacently positioned in line with said wedge-shaped element, a readout superconducting element adjacently positioned in-line to both said measuring and said wedge-shaped superconducting thin-film elements, said readout thin-film element to be resistively responsive to the simultaneous application of magnetic fields emanating from the flow of supercurrent through said wedge-shaped and said measuring superconducting thin-film elements, a differential voltage amplifier connected to said resistively responsive readout thin-film element to provide a varying voltage corresponding in variation to said resistive response, and a feedback current amplifier connected between said voltage amplifier and said wedge-shaped thin-film element to provide a feedback bias current to said wedge-shaped bias element whereby the total bias current through said wedge-shaped element is stabilized to minimize the effects of defects in fabrication, accuracy and material purity upon predicted measuring device performance.

References Cited

UNITED STATES PATENTS

| | | | |
|---|---|---|---|
| 3,049,686 | 8/1962 | Walters | 338—32 |
| 3,050,683 | 8/1962 | Anderson | 324—117 |
| 3,196,281 | 7/1965 | Schlig | 338—32 X |
| 3,244,974 | 4/1966 | Dumin | 324—46 |
| 3,259,844 | 7/1966 | Casimir | 324—103 |
| 3,283,282 | 11/1966 | Rosenberg | 338—32 |

RUDOLPH V. ROLINEC, *Primary Examiner.*

J. J. MULROONEY, E. F. KARLSEN,
*Assistant Examiners.*